United States Patent [19]

Stage

[11] Patent Number: 4,599,143

[45] Date of Patent: Jul. 8, 1986

[54] PROCESS FOR DEODORIZING AND/OR PHYSICAL REFINING OF HIGH-BOILING ORGANIC EDIBLE OILS, FATS AND ESTERS

[76] Inventor: Hermann Stage, Ludgeristrasse 9, 4400 Münster, Fed. Rep. of Germany

[21] Appl. No.: 514,903

[22] Filed: Jul. 18, 1983

[30] Foreign Application Priority Data

Jul. 23, 1982 [DE] Fed. Rep. of Germany ....... 3227669

[51] Int. Cl.$^4$ ............................ B01D 1/22; C09F 5/10
[52] U.S. Cl. .......................................... 203/6; 203/72; 203/79; 203/88; 203/92; 159/13.4; 159/16.3; 159/18; 159/49; 202/176; 202/185 A; 260/428; 426/488; 426/492
[58] Field of Search ....................... 203/72, 88, 89, 92, 203/93, 96, 91, 95, 97, 42, 100, 6, 34, 29, 78, 79, 80; 159/13 A, 13 B, 13.4, 13 R, 18, 16 S, 49, 16.3, 13 C, 8, 14; 426/488, 492, 487; 202/205, 173, 176, 174, 234, 233, 237, 236, 185 A, 183, 184; 260/428

[56] References Cited

U.S. PATENT DOCUMENTS

| | | | |
|---|---|---|---|
| 2,150,683 | 3/1939 | Hickman | 203/6 |
| 2,159,303 | 5/1939 | Waterman et al. | 203/72 |
| 2,322,056 | 6/1943 | Potts | 203/76 |
| 2,368,669 | 2/1945 | Lee et al. | 203/79 |
| 2,567,409 | 9/1951 | Trent | 203/34 |
| 2,621,196 | 12/1952 | Thurman | 203/79 |
| 2,759,883 | 8/1956 | Thurman | 203/72 |
| 2,876,174 | 3/1959 | Preston | 203/34 |
| 2,999,795 | 9/1961 | Yagi et al. | 159/47.1 |
| 3,061,622 | 10/1962 | Fiala | 203/42 |
| 3,232,847 | 2/1966 | Hoff | 203/100 |
| 3,503,854 | 3/1970 | Good | 203/72 |
| 3,737,378 | 6/1973 | Mori et al. | 203/89 |
| 4,036,865 | 7/1977 | Hartmann et al. | 203/79 |
| 4,095,963 | 6/1978 | Lineberry | 203/6 |
| 4,211,610 | 7/1980 | McGowan | 202/177 |
| 4,394,221 | 7/1983 | Stage et al. | 203/89 |

FOREIGN PATENT DOCUMENTS

| | | |
|---|---|---|
| 3227669 | 7/1983 | Fed. Rep. of Germany . |
| 74691 | 12/1960 | France ............... 159/18 R |
| 2046606 | 11/1980 | United Kingdom . |

*Primary Examiner*—Wilbur Bascomb
*Attorney, Agent, or Firm*—Pollock, Vande Sande & Priddy

[57] ABSTRACT

The deodorization and/or physical refining of high-boiling organic edible oils, fats and esters is carried out according to the principle of continuous counter-current falling film stripping steam distillation in an internally imposed temperature field in at least two different zones having different flow conditions for the liquid film and the vapors, respectively, prevailing therein. In the initial zone 10 directly adjacent the liquid charge and ensuring at least two separation stages the vapors flow through trickle passages having a hydraulic equivalent diameter of 73 to 150 mm. If necessary, this initial zone may be subdivided, wherein in the first sub-zone the trickle passages are provided with hydraulic equivalent diameters of 120 to 150 mm and in the second sub-zone the trickle passages are provided with hydraulic equivalent diameters of 73 to 120 mm. In the final zone 22 ensuring six to eight theoretical separation stages the vapors flow through trickle passages having a hydraulic equivalent diameter of 25 to 33 mm. The resultant pressure drop through all zones is less than 2 mbar, which leads to a particularly low requirement of stripping steam. If required, a flash vessel 46 may be disposed between the high temperature heat exchanger 9 and the falling film column 10, in which flash vessel the crude cocoa butter heated to the working temperature is subjected to a flash treatment at substantially the working pressure in the falling film column 10.

37 Claims, 8 Drawing Figures

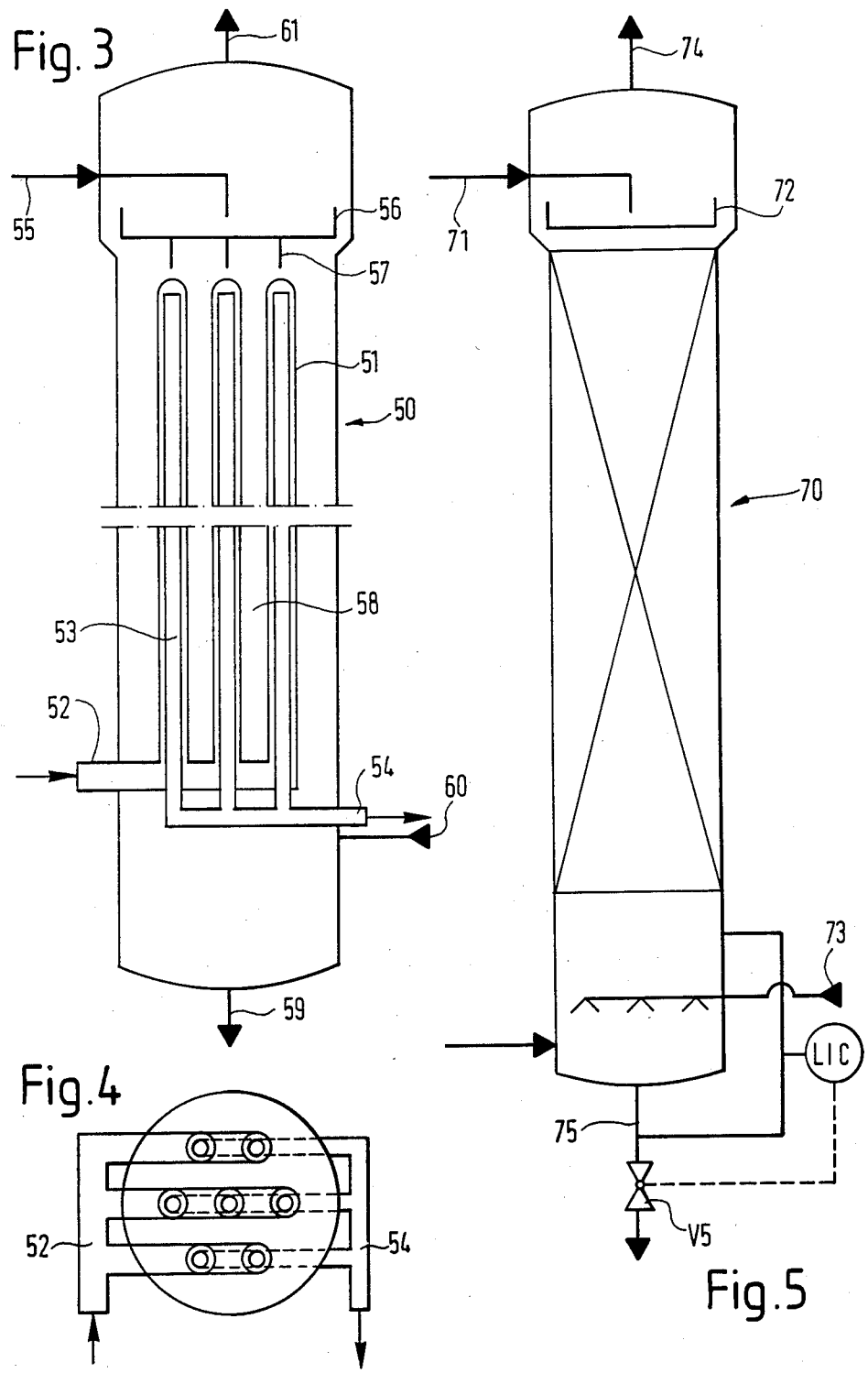

PROCESS FOR DEODORIZING AND/OR PHYSICAL REFINING OF HIGH-BOILING ORGANIC EDIBLE OILS, FATS AND ESTERS

The invention relates to the deodorizing and/or physical refining of high-boiling organic edible oils, fats and esters according to the principle of continuous countercurrent falling film stripping steam distillation in an externally imposed temperature field. For this purpose, the present invention provides a novel process and a novel apparatus for carrying out the process.

In particular, the invention relates to a process of deodorizing and/or physical refining of high-boiling organic edible oils, fats and esters, wherein the liquid heated to a temperature ranging between 220° and 280° C., at a working pressure ranging between 2 and 10 mbar, flows down as a thin film having a film thickness of less than 1.0 mm at the wall of surfaces which substantially are disposed vertically, which define trickle passages and of which at least a part is maintained at a higher temperature than the flowingdown liquid, and wherein vapor of a low-molecular liquid, preferably steam, is directed through these trickle passages in countercurrent.

A process of this kind and an apparatus suitable for carrying out the process are known from the German Laid-Open Patent Application No. 29 14 101. In the known process there is provided a single countercurrent falling film stripping steam distillation zone, which is realized within a falling film column designed as a tube bundle column. The liquid flows downwardly from the distributor of this tube bundle column at the inner walls of the trickle passages, which have an internal diameter ranging between 34 and 72 mm. The oil to be subjected to physical refining and deodorization, respectively, flows downwardly as a thin film having a film thickness of approx. 0.4 mm at a feed temperature of 250° C. and in countercurrent to the stream of stripping steam rising from below, the working pressure at the top of the falling film column being 5.33 mbar. This known proposal yielded a considerable improvement with respect to the then known proposals—as is apparent in particular from the essay "Heutiger Entwicklungsstand der Anlagen zur physikalischen Raffination pflanzlicher Öle" in Seifen, Öle, Fette, Wachse, 105, 395–401, 427–433, 473–475, 531–535 (1979)—due to the fact that the proportion of free fatty acids and other low-boiling components in the treated edible oil can be decreased to 0.03% by weight, which required only an amount of stripping steam of 8 kg/ton of treated edible oil.

The amount of stripping steam required is of decisive influence on the economy of this process, because the used amount of stripping steam has to be directed away from the vacuum aggregate and therefore decisively influences the vapor requirement of the vacuum system; in practice, one estimates in connection with modern apparatus that if the cooling water inlet temperature is 25° C., the vapor consumption in the vacuum system will be approx. six to eight times the amount of the stripping stream used.

Based on a process of the kind specified above, the object to be solved by the present invention is to decrease in a single continuous process the proportion of free fatty acids and other low-boiling components in the final product to at least 0.03% by weight, to reduce even further the required amount of stripping steam relative to the process known from the German Laid-Open Patent Application No. 29 14 101 and considerably to reduce the total energy requirement per ton of finished oil, furthermore, to provide an apparatus for carrying out this improved process.

In accordance with the invention this object is solved by a process having the measures specified in claim 1 and, respectively, by an apparatus having the features specified in claim 17. Advantageous modifications and further developments of the invention are apparent from the subclaims.

In particular, the further development of the abovementioned process provided by the invention resides in that at least two countercurrent falling film stripping steam distillation zones are provided which operate in series and are in vapor and liquid communication with each other, the final zone thereof, which is disposed downstream in the direction of the downflowing liquid, having smaller hydraulic equivalent diameters of the trickle passages, or the equivalent thereof in the case of non-tubular trickle passages, than the initial zone(s) disposed further downstream, and in that stripping steam is supplied exclusively in the bottom of the final zone.

The apparatus provided by the invention for carrying out this process is provided with at least two different falling film columns which operate in series and are in vapor and liquid communication with each other, the falling film column(s) which is (are) disposed further upstream in the direction of flow of the liquid—with which column(s) the initial zone of the countercurrent falling film stripping steam distillation zones is realized—having trickle passages of a hydraulic equivalent diameter ranging from 73 to 150 mm or the equivalent thereof in the case of non-tubular trickle passages, whereas the falling film column which is disposed further downstream and within which the final zone of the countercurrent falling film stripping steam distillation zones is realized, has trickle passages of a hydraulic equivalent diameter ranging between 25 and 33 mm, or the equivalent thereof in the case of non-tubular trickle passages. Preferably, for the falling film column disposed upstream a length of the trickle passages ranging from 2 to 6 m is provided and for the falling film disposed downstream a length of the trickle passages ranging from 6 to 10 m is provided.

This important aspect of the invention is based on the surprising observation that the physical refining and/or deodorization of edible oils, fats and esters according to the principle of continuous countercurrent falling film stripping steam distillation in an externally imposed temperature field does not take place linearly. The following remarks specifically relate to the deodorization and/or physical refining of palm oil, however, the basic know-how readily can be transferred also to other triglycerides and the like. Mostly, the palm oil to be physically refined has a proportion of free fatty acids and other low-boiling components in the order of approx. 5% by weight. According to the invention, it has been realized that for reducing the proportion of the to be removed components, which have a much higher volatility as compared with the palm oil, to approx. 10% of their original content a maximum of only two theoretical separation stages is required, which, under the mentioned operating conditions, can be obtained already with an exchange length of 2 to 6 m in the flow passages having a hydraulic equivalent diameter ranging from 73 to 150 mm. Preferably, in this initial zone an exchange length of approx. 3 to 5 m already is sufficient.

This initial zone may be subdivided into two sub-zones, for these sub-zones different hydraulic equivalent diameters of the trickle passages, or the equivalents thereof in the case of non-tubular trickle passages, are then provided. In this case, the first sub-zone directly adjacent the liquid charge should be provided with trickle passages having a hydraulic equivalent diameter which ranges from 120 to 150 mm, and the subsequent second sub-zone should be provided with trickle passages having a hydraulic equivalent diameter which ranges from 73 to 120 mm, and respectively, the equivalent thereof in the case of non-tubular trickle passages. Such a process involving a total of three zones permits an even greater decrease of the pressure drop. Moreover, this three-zone-type process is suited in particular for the physical refining of edible oils having a particularly high content of free fatty acids of approx. 4 to 10% by weight. In the case of the three-zone-type process, the first sub-zone should ensure approx. one theoretical separation stage and the subsequent second sub-zone should ensure at least one, preferably one to two theoretical separation stages.

For separating the remaining residual impurities, except for a residual acid content of less than 0.03% by weight, preferably less than 0.02% by weight, six to eight theoretical separation stages are required in the final zone, which is connected downstream; under the mentioned conditions, these separation stages can very well be realized with flow passages having a hydraulic equivalent diameter between 25 and 33 mm, the exchange length ranging between 6 and 10 m, preferably being 8 m.

The redistribution of the oil to the trickle passages of the final zone still further increases the efficiency of the residual physical refining taking place therein.

According to a further important aspect of the invention the pressure drop between the bottom of the final zone and the top of the first initial zone is kept less than 2.0 mbar, preferably less than 1.4 mbar. This permits maximum stripping with a minimum amount of stripping steam used.

According to a further aspect of the invention, not only the trickle passage diameters, or the equivalents thereof in the case of non-tubular trickle passages, are specifically adapted to the respective requirements, which are necessary for the principal or rough separation of the impurities in the initial countercurrent falling film stripping steam distillation zone, on the one hand, and for the residual or fine separation in the final countercurrent falling film stripping steam distillation zone, on the other hand, but according to this further aspect of the invention also the flow conditions of the liquid can be adapted to these requirements.

The permissible pressure drop in the final zone determines therein the total circumferential length of the trickle passages. In the initial zone(s) which is and, respectively, are disposed further upstream the total circumferential length of the trickle passages must at least be equal, but preferably it is increased from one zone to the other so that the zone adjacent the liquid charge has the greatest total circumferential length. The upper limit of the total circumferential length in this zone is selected so that therein the Reynolds number of the liquid is not less than 200.

In accordance with the invention, particularly favorable flow and exchange conditions for the liquid film, on the one hand, and the vapor flow, on the other hand, will be obtained when the liquid flow rate through each zone practically is the same and in the case of physical refining per hour amounts to 0.4 to 1.6 m³ and preferably to 0.7 to 0.9 m³ of liquid per m of the total circumferential length of the trickle passages. If according to the process provided by the invention only a deodorization is to be carried out—e.g. because the liquid has been refined already chemically—higher values may be provided; in this case, the liquid flow rate may amount to 0.8 to 2.4 m³/m·h and preferably to 1.4 to 1.8 m³/m·h.

Based on these values of the load on the trickle passage walls and under consideration of the above explanations relating to the total circumferential length, for the physical refining in the initial zone the film thickness of the liquid film is maintained between 0.20 and 0.50 mm, preferably between 0.35 and 0.45 mm. If only a deodorization is carried out, the film thickness in the initial zone may rise up to 0.6 mm. In contrast thereto, in the final zone the film thickness of the liquid film is maintained between 0.30 and 0.60 mm and preferably between 0.35 and 0.50 mm. Generally, within these film thickness ranges, the lower film thickness values are suitable for the physical refining and the higher film thickness values are suitable for the deodorization.

According to a further aspect of the invention, such flow conditions are provided in the initial zone, possibly also in the sub-zones thereof and in the final zone, that from one zone to the other the liquid film trickling down has increasing Reynolds numbers Re. As is well known, the Reynolds number Re of a liquid is defined as follows:

$$Re = \frac{V \cdot \gamma_F \cdot l}{v \cdot g} = \frac{G_F \cdot 10{,}000}{C_p \cdot 2.02 \cdot 9.81}$$

where:

$V$ = volume of the liquid (m³)

$\gamma_F$ = density of the liquid (kg/m³)

$l$ = characteristic length (m)

$v$ = viscosity $\dfrac{(C_p \cdot 1.02)}{10{,}000}$ $g$ = acceleration due to gravity (9.81 m/sec²)

$G_F = \dfrac{\text{volume} \cdot \gamma_F}{\text{tube number} \cdot \text{internal diameter} \cdot \pi \cdot 3{,}600}$ $C_p$ = viscosity (centipoise)

The Reynolds numbers of the liquid film in the various zones may differ considerably as regards the physical refining, on the one hand, and the deodorization, on the other hand, so that in the following a differentiation will be made between these two processes.

Physical refining means the removal of the lower boiling components, especially free fatty acids by distillative measures; therefore the term "physical refining" is used in the meaning of "distillative deacidification". Deodorization means the removal of those components which provide unpleasant odor. Usually, the physical refining causes simultaneously the deodorization. However, in those cases where a chemical refining has been effected, an additional deodorizing treatment is necessary in order to provide a suited product.

As regards the physical refining, good results are achieved with Reynolds numbers ranging between 200 and 300, preferably between 200 and 270, in the initial zone and with Reynolds numbers ranging between 250 and 300, preferably between 260 and 280, in the final zone.

As regards the deodorization, good results are achieved with Reynolds numbers ranging between 200 and 500, preferably between 200 and 450, in the initial zone and with Reynolds numbers ranging between 400 and 500, preferably between 420 and 480, in the final zone. For influencing the Reynolds number, above all, the temperature of the liquid may be varied—as far as this is permitted by the stability thereof—, because this causes a change of the viscosity of the liquid. In particular, in the case of oils having a low content of unsaturated triglyceride components, such as e.g. palm oil, peanut oil, coconut oil, palm kernel oil, higher working temperatures may be provided.

The main stripping takes place in the initial zone. According to a further aspect of the invention, the liquid is heated therein by approx. 5° to 12° K., preferably by 6° to 10° K., for providing the evaporation heat for the impurities. For example, palm oil is fed to the distributor (of the first sub-zone) of the initial zone at a temperature of 255° C. and has a temperature of 263° C. at the bottom (of the possibly second sub-zone) of the initial zone. For this purpose, the temperature of the trickle passage walls will exceed the liquid temperature by at least 4° K. Preferably, the temperature of the indirectly heated trickle passage walls will be kept by 4 to 12° K. and, with particular preference, by 6° to 8° K., in excess of the liquid temperature.

Since, on the other hand, the quality of the finished oil depends both on the average temperature difference between heating medium and liquid temperature in the final zone and, above all, on the liquid temperature at the bottom of the final zone, a heating of the oil film shall be prevented therein since otherwise impairments of the quality and in particular in the case of highly sensitive triglycerides with unsaturated fatty acids transesterifications must be feared. Therefore, the temperature of the trickle passage walls in the final zone is maintained within the range between the liquid temperature and at most 2° K. in excess thereof; in practice, good conditions were achieved when the temperature of the indirectly heated trickle passage walls was maintained at a level in excess of the liquid temperature by 0.5° to 2.0° K., preferably by less than 1° K. In the above example, the liquid temperature of the palm oil at the bottom of the final zone should not exceed 265° C.

According to a particularly preferred, more inexpensive embodiment of the invention the deodorization and/or physical refining of high-boiling organic edible oils, fats and esters is carried out under the conditions set out in the following.

I. In the following operational conditions are provided in the initial zone directly adjacent the liquid charge and ensuring at least two theoretical separation stages:

(k) The vapors flow through trickle passages having a hydraulic equivalent diameter which ranges between 73 and 120 mm, or the equivalent thereof in the case of non-tubular trickle passages;

(l) for deodorization, the film thickness of the liquid film is maintained between 0.25 and 0.55 mm, and for physical refining, it is maintained between 0.20 and 0.50 mm;

(m) for deodorization, the Reynolds number of the downflowing liquid is maintained within a range of 350 and 400, and for physical refining, it is maintained within a range of 200 and 280; and (n) the temperature of the trickle passage walls is maintained at a level in excess of the liquid temperature by 4° to 12° K. II. Furthermore, the following operational conditions are observed in the final zone operating downstream thereof and ensuring at least six theoretical separation stages:

(w) The vapors flow through trickle passages having a hydraulic equivalent diameter which ranges between 25 and 33 mm, or the equivalent thereof in the case of non-tubular trickle passages;

(x) for deodorization, the film thickness of the liquid is maintained between 0.35 and 0.7 mm, and for physical refining, it is maintained between 0.35 and 0.6 mm;

(y) for deodorization, the Reynolds number of the downflowing liquid is maintained within a range of 400 and 500, and for physical refining, it is maintained within a range of 250 and 300; and (z) the temperature of the trickle passage walls is maintained within the range between the liquid temperature and at most 2° K. in excess thereof.

According to a further, particularly preferred embodiment of the invention, in which the pressure drop is even less and which, therefore, requires an even smaller amount of stripping steam charge per ton of oil flow rate, the deodorization and/or physical refining of high-boiling organic edible oils, fats and esters is carried out under the following conditions.

III. The following operational conditions are provided in the first sub-zone of the initial zone directly adjacent the liquid charge and ensuring at least approx. one theoretical separation stage:

(a) The vapors flow through trickle passages having a hydraulic equivalent diameter which ranges between 120 and 150 mm, or the equivalent thereof in the case of non-tubular trickle passages;

(b) for deodorization, the film thickness of the liquid film is maintained between 0.3 and 0.5 mm, and for physical refining, it is maintained between 0.2 and 0.4 mm;

(c) for deodorization, the Reynolds number of the downflowing liquid is maintained within a range of 350 and 400, and for physical refining, it is maintained within a range of 200 and 260; and (d) the temperature of the trickle passage walls is maintained at a level being 5° to 10° K. in excess of the liquid temperature.

IV. The following operational conditions are provided in the second sub-zone of the initial zone adjacent the first sub-zone and ensuring at least one theoretical separation stage:

(k) The vapors flow through trickle passages having a hydraulic equivalent diameter which ranges between 73 and 120 mm, or the equivalent thereof in the case of non-tubular trickle passages;

(l) for deodorization, the film thickness of the liquid film is maintained between 0.35 and 0.55 mm, and for physical refining, it is maintained between 0.25 and 0.45 mm;

(m) for deodorization, the Reynolds number of the downflowing liquid is maintained within a range of 375 and 450, and for physical refining, it is maintained within a range of 220 and 280; and (n) the temperature of the trickle passage walls is maintained at a level being 2° to 6° K. in excess of the liquid temperature.

V. Furthermore, the following operational conditions are observed in the final zone operating downstream thereof and ensuring at least six theoretical separation stages:

(w) The vapors flow through trickle passages having a hydraulic equivalent diameter which ranges between 23 and 33 mm, or the equivalent thereof in the case of non-tubular trickle passages;

(x) for deodorization, the film thickness of the liquid is maintained between 0.4 and 0.6 mm, and for physical refining, it is maintained between 0.3 and 0.5 mm;

(y) for deodorization, the Reynolds number of the downflowing liquid is maintained within a range of 400 and 500, and for physical refining, it is maintained within a range of 250 and 300; and (z) the temperature of the trickle passage walls is maintained within the range between the liquid temperature and at most 2° K. in excess thereof.

According to the process according to the invention, in particular under the above-mentioned conditions, it is possible to achieve already with a stripping steam requirement of less than 0.7% of the crude oil throughput a reduction of the residual acid content and of further impurities to 0.02% by weight or less of the finished oil. In practical testing of the invention, a stripping steam requirement of approx. 3 to 5 kg/ton of crude oil could be achieved, which—in the sense of the above remarks—also considerably reduces the vapor requirement for the vacuum system and thus the total vapor requirement of the process. Provided that for the generation of a vacuum the temperatures of the cooling water at the inlet to the vacuum aggregate were maintained at approx. 25° C. and at the outlet therefrom were maintained at approx. 35° C., the total energy requirement necesssary for heating the oil, for evaporating the fatty acid, for producing the stripping steam and for producing the vapor required by the vacuum aggregate as well as for compensating for further normal heat losses amounted only to a total of 44,000 kcal/ton of crude oil, of which only approx. 18,000 kcal/ton were required as high-temperature heat. In contrast thereto, the total energy requirement in the process known from the German Laid-Open Patent Application No. 129 14 101 still was approx. 57,000 kcal/ton, the proportion of the high-temperature heat being approx. 25,000 kcal/ton.

The invention relates to the deodorization and/or physical refining of high-boiling organic compounds. In this connection, "high-boiling" shall mean that at a vacuum of 12 mbar the liquids to be treated would boil already above their decomposition temperature of approx. 300° C. The liquid to be treated is heated to a temperature of approx. 180° to 245° C. in a first upstream heat exchanger—which preferably utilizes the heat of the hot finished oil passing in countercurrent—and subsequently it is adjusted in the high-temperature heat exchanger to the working temperature of 220° to 270° C. and introduced into the initial zone at this temperature. Palm oil is introduced into the initial zone e.g. at a temperature of approx. 250° to 260° C. Within the specified temperature range, the liquid viscosity of the liquid trickling down in the initial zone and the final zone is below 0.08 Pa·s and preferably below 0.06 Pa·s, fall velocities of the oil films between 0.4 and 1.2 m/sec., preferably between 0.6 and 0.9 m/sec., resulting therefrom. Mostly, the fall velocity in the initial zone is kept in excess of that in the final zone by approx. 10%.

In a practical embodiment, the residence times of the individual liquid particles for the physical refining (flow rate 10,000 kg/h) and, respectively, the deodorization (flow rate 16,000 kg/h) are as shown in the following Table.

| Zone | Physical Refining | Deodorization |
| --- | --- | --- |
| initial zone (10 m) | approx. 7.8 sec. | approx. 5.7 sec. |
| final zone (8 m) | approx. 13.6 sec. | approx. 9.4 sec. |
| first sub-zone (2 m) | approx. 3.9 sec. | approx. 2.8 sec. |
| second sub-zone (3 m) | approx. 5.4 sec. | approx. 3.8 sec. |
| final zone (7 m) | approx. 11.9 sec. | approx. 8.5 sec. |

Frequently, the heat bleaching is also carried out together with the physical refining and/or deodorization of edible oils, in particular in order to destroy long-chain pigments such as e.g. carotenoids. For this purpose, a post-treatment of the purified oil in a hold-up vessel may be provided in accordance with the proposal of the German Laid-Open Patent Application No. 29 14 101.

According to a further aspect of the present invention it has been realized that the quality of taste of the finished oil may noticeably be improved by carrying out such a heat bleaching if the hold-up vessel is equipped with means for adding stripping steam and for indirect heating to compensate for the heat losses. In contrast to the known proposal—for achieving a long retention path for the oil with maximum plug flow and a variable residence time between 5 and 65 min., the hold-up vessel is not provided as a final part but is connectable before the final zone; in the case of a subdivided initial zone, the hold-up vessel could also be connectable after the first and before the second sub-zone. Mostly, the oil is introduced into the hold-up vessel at the bottom temperature of the preceding zone. The heating provided therein only serves to compensate for occurring heat losses to maintain the oil temperature so that the oil can be introduced into the following zone at this temperature. As the principal amount of the impurities was separated already in the intitial zone, the thermal reactions during the retention time in the hold-up vessel only set free a small amount of the more readily volatile breakdown products, the discharge of which requires only a small amount of stripping steam. According to the invention, the stripping steam quantity introduced into the hold-up vessel amounts only to 0.02 to 0.2% of the crude oil throughput, preferably approx. 0.1% of the crude oil throughput.

Further, the mentioned conditions permit the provision of a vacuum in the hold-up vessel of only 60 to 280 mbar, preferably of 130 to 200 mbar. Under these conditions, the contaminated stripping steam withdrawn from the hold-up vessel may be precipitated by means of ordinary cooling water within the condensation range of 38° to 65° C., preferably between approx. 50° and 60° C. Thus, the vapor requirement of the aggregate producing the vacuum could be reduced by approx. 5 to 15 kg/ton of crude oil flow rate.

However, it is pointed out expressly that it is not suitable in each case to pass the oil also through the hold-up vessel. Exactly when the final acid content of the finished product distinctly is to be below 0.02% by weight of the finished oil and furthermore an oil is concerned which due to its relatively high content of polyunsaturated fatty acids in the glycerides is of particular thermal sensitivity it proves to be suitable to direct the oil leaving the bottom of the initial zone past the hold-up vessel directly to the distributor in the head of the final zone. Under these conditions the residence time of individual oil particles in the high-temperature portion of the system may be kept below 30 sec. so that thermal damage is largely excluded due to the short and gentle operating conditions including thermally conditioned transesterifications.

As has already been set out above, the invention relates to the deodorization and/or physical refining of high-boiling organic edible oils, fats and esters. Suitable oils e.g. are palm oil, soy oil, cottonseed oil, coconut oil, palm kernel oil, rape oil, wheat germ oil, olive oil, hydrogenated fish oil and the like. Suitable fats e.g. are beef tallow, lard, mutton tallow and the like. Suitable esters e.g. are monoglycerides, diglycerides and triglycerides of higher fatty acids, the esters of phthalic acid suitable as plasticizers, sebacic acid and the like; the esters of higher alcohols with fatty acids such as e.g. butyl stearate and similar esters.

Additionally, the invention may be applied also to the gentle purification by distillation of other thermally sensitive mixtures, whose components which are to be separated have a vapor pressure exceeding that of the higher boiling thermally sensitive substance by several powers of ten. The crude oils primarily used for processing edible oils, such as in particular palm oil and soy oil, have a greater or smaller content of free fatty acids within the range of approx. 1 to 10%, depending on their country of origin. Additionally, such crude oils contain approx. 0.05 to 0.3% by weight of water and 0.01 to 0.1% by weight of other lower boiling components separable by distillation with open (stripping) steam. Prior to the heating of such crude oils to the treatment temperature and the carrying-out of the process according to the invention, preferably degumming and, in a preceding treatment stage, a degasification is carried out.

According to a further aspect of the invention, the degasification is carried out at relatively low temperatures between 40° and 100° C., preferably between 60° and 80° C., as well as under a working pressure of approx. 100 to 280 mbar, preferably between 120 and 200 mbar. Under these conditions, the crude oil is degasified sufficiently but not dried entirely. There rather remains in the crude oil a residual amount of dissolved water in the order of 0.05 to 0.2% by weight, which is set free only under the working conditions in the subsequent initial zone of the countercurrent falling film stripping steam distillation zones (working pressure 2.5 to 15 mbar, preferably 5 to 8 mbar; temperature of the liquid film 230° to 275° C., preferably 250° to 275° C.). The steam set free from the liquid film under these conditions additionally acts as a stripping steam, contributes to the renewal of the surface of the liquid film in the initial zone and there also increases the Reynolds number of the liquid. Thus, if the crude oil is degasified but is introduced into the initial zone with a water content of approx. 0.05 to 0.2% by weight, this will noticeably improve therein the mass transfer with respect to a downflowing film of liquid free from water. Preferably, the vapors set free in the degasification stage are also fed past the first part of the vacuum aggregate with the respective compression stages to an injection condenser of a corresponding pressure and are precipitated therein by means of an ordinary cooling water in order to avoid an additional load on the compression portion.

Under certain conditions, e.g. in the case of processing of crude oils stored under poor conditions or in the case of so-called "acid oils", their content of free fatty acids and other low-boiling components may adopt values which are so high, e.g. of up to approx. 10% by weight and more, that the mixtures boil already without any addition of stripping steam at the provided working conditions—temperature up to 28° C., working pressure 10 mbar.

According to a further aspect of the invention this observation is utilized and a flash treatment is carried out before introduction of the crude oil into the initial zone. For this purpose, a flash vessel may be provided into which the crude oil heated to working temperature is introduced. The working pressure prevailing in the flash vessel is practically the same as that in the initial zone (below 10 mbar), for which purpose the top of the flash vessel is suitably connected to the injection condenser connected upstream of the vacuum generating aggregate. Advantageously, the flash vessel is disposed above the distributor in the top of the initial zone so that the flashed crude oil gets from the bottom of the flash vessel onto this distributor—without use of a pump—only under the action of its weight. It is possible solely by means of such a flashing—without supply of stripping steam—to reduce the proportion of free fatty acids and other low-boiling components in the crude oil to approx. 2 to 4% by weight under physical refining conditions which according to the invention are characteristic—temperature approx. 260° C., working pressure approx. 2.5 to 6.8 mbar. Evidently, such a flashing yields a reduction of the stripping steam requirement and thus also an energy saving in the vacuum generating aggregate.

Such a flashing may be provided in addition to the preceding degumming, degasifying and partial dehydrating.

The quality of the finished oil may be further improved by a per se known addition of complexing agents into the bottom of the final zone or into the withdrawn and already further cooled finished oil. Such complexing agents, above all, serve to complex metal ions always present in small amounts and having an oxidation-promoting effect. For this purpose, e.g. the addition of citric acid in an amount of 5 g/ton of finished oil into the bottom of the final zone has proven to be a success. Other suitable complexing agents are tartaric acid, phosphoric acid, ascorbic acid, lactic acid and the like. As far as such complexing agents are already impaired at the bottom temperature, they are suitably added after cooling f the finished oil to approx. 120° to 160° C. within the range of polishing filtration.

According to an important aspect, the stripping steam is added only to the bottom of the final zone. Thus optimum conditions are prevailing therein for the stripping of the residual content of free fatty acids still present. Furthermore, in the bottom of this final zone the temperatures necessary for the mass transfer can thus be kept on the lowest possible value. Finally, this measure ensures throughout all zones a true countercurrent principle with maximum concentration of the fatty acids in the vapor so that, based on substances free from water, the vapor leaving at the head of the column consists of more than, 95% of free fatty acids and of less than 3% of the triglycerides of the treated oils.

In the following, the apparatus for carrying out the process according to the invention will be described by means of preferred embodiments with reference to the drawings, in which FIG. 1 is a flow diagram with two countercurrent falling film stripping steam distillation zones for carrying out the process according to the invention;

FIG. 3 shows a falling film column which is provided wtih cartridges and within which the initial zone of the process according to the invention may be carried out;

FIG. 4 shows the falling film column of FIG. 3 in cross-section;

FIG. 5 shows a true trickle column of low pressure drop, within which the final zone of the process according to the invention may be carried out;

Figure 1:
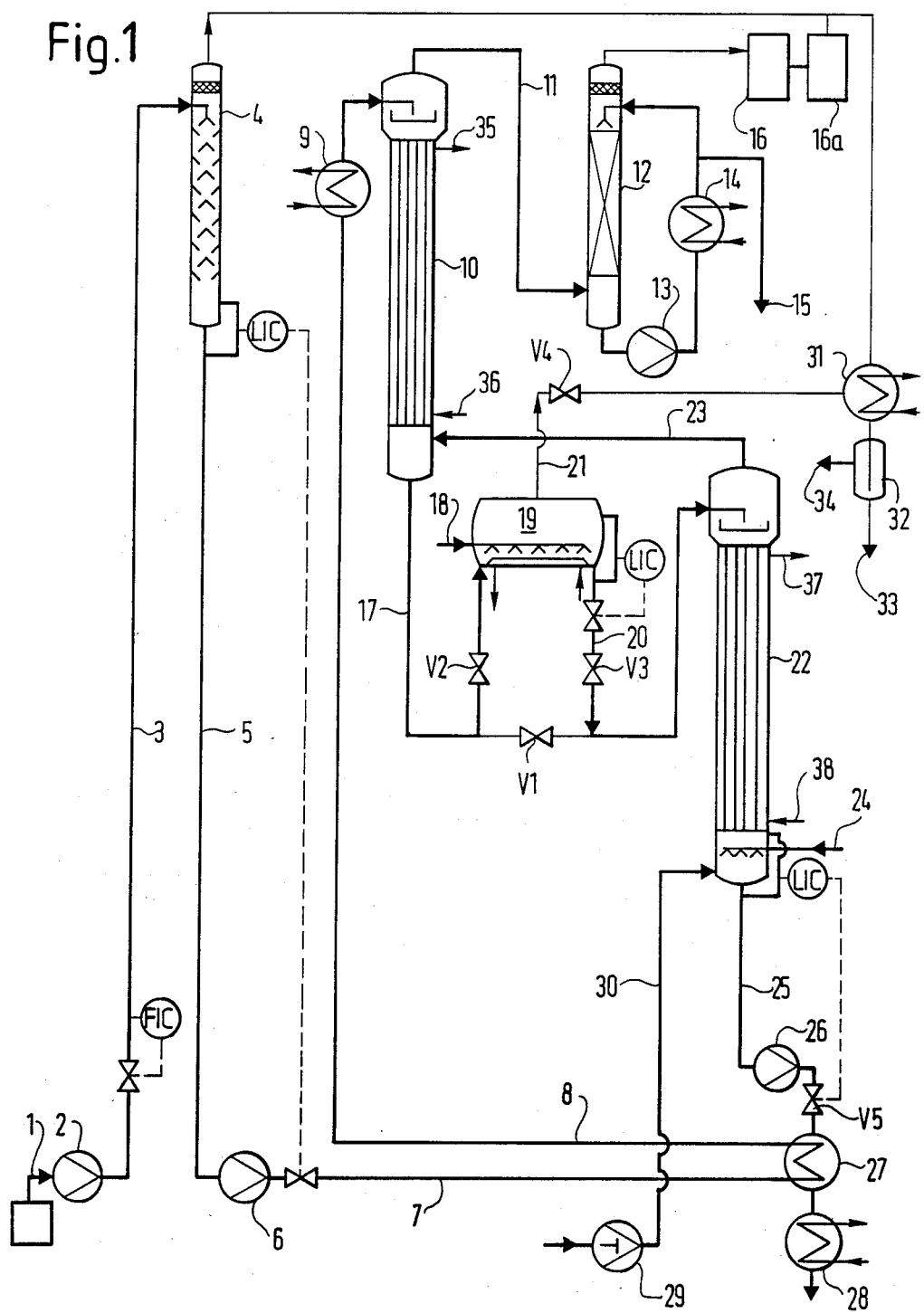
FIG. 1a is a flow diagram similar to FIG. 1, however, having additionally incorporated a flash zone.

As is apparent from FIG. 1, the total apparatus for deodorizing and/or physical refining—apart from the not individually mentioned usual component parts of such apparatus such as tubings, pumps, armatures, control means and the like—in their principal parts mainly consists of the degasification stage 4, the heat exchangers 27 and 28, a first falling film column 10, the injection condenser 12 with a cooler 14 disposed in the circulation line, the vacuum generating aggregate 16, 16a, the hold-up vessel 19 connected in parallel to the line 17, the last falling film column 22, the stripping steam supply means 24 and the withdrawal line 25 for the finished product.

In particular—as is apparent from FIG. 1—the crude oil is supplied from a storage tank 1 to the head of the degasification stage 4 by means of the pump 2 through the line 3. The degasification stage 4 is operated e.g. at a working pressure of 200 mbar. The liquid level control means at the bottom of the degasification stage 4 ensures that at the intake side of the downstream delivery pump 6—connected via line 5—there will always be a correspondingly high liquid column, with which it is always possible to ensure a slight overpressure in the pump 6. Thus,—even if for the delivery pump 6 the more inexpensive pumps provided with glands are used—a renewed entry of atmospheric oxygen into the already degasified oil can be prevented.

The oil is fed by the delivery pump 6 to a heat exchanger 27 through the line 7. In the heat exchanger 27 the degasified but still water-containing oil is heated by heat exchange with the finished oil withdrawn from the bottom of the last falling film column 22. The crude oil preheated in the heat exchanger 27 is fed through the line 8 to the high-temperature heat exchanger 9, where heating to the working temperature takes place by exchange with a high-temperature heating medium.

Figure 1A:
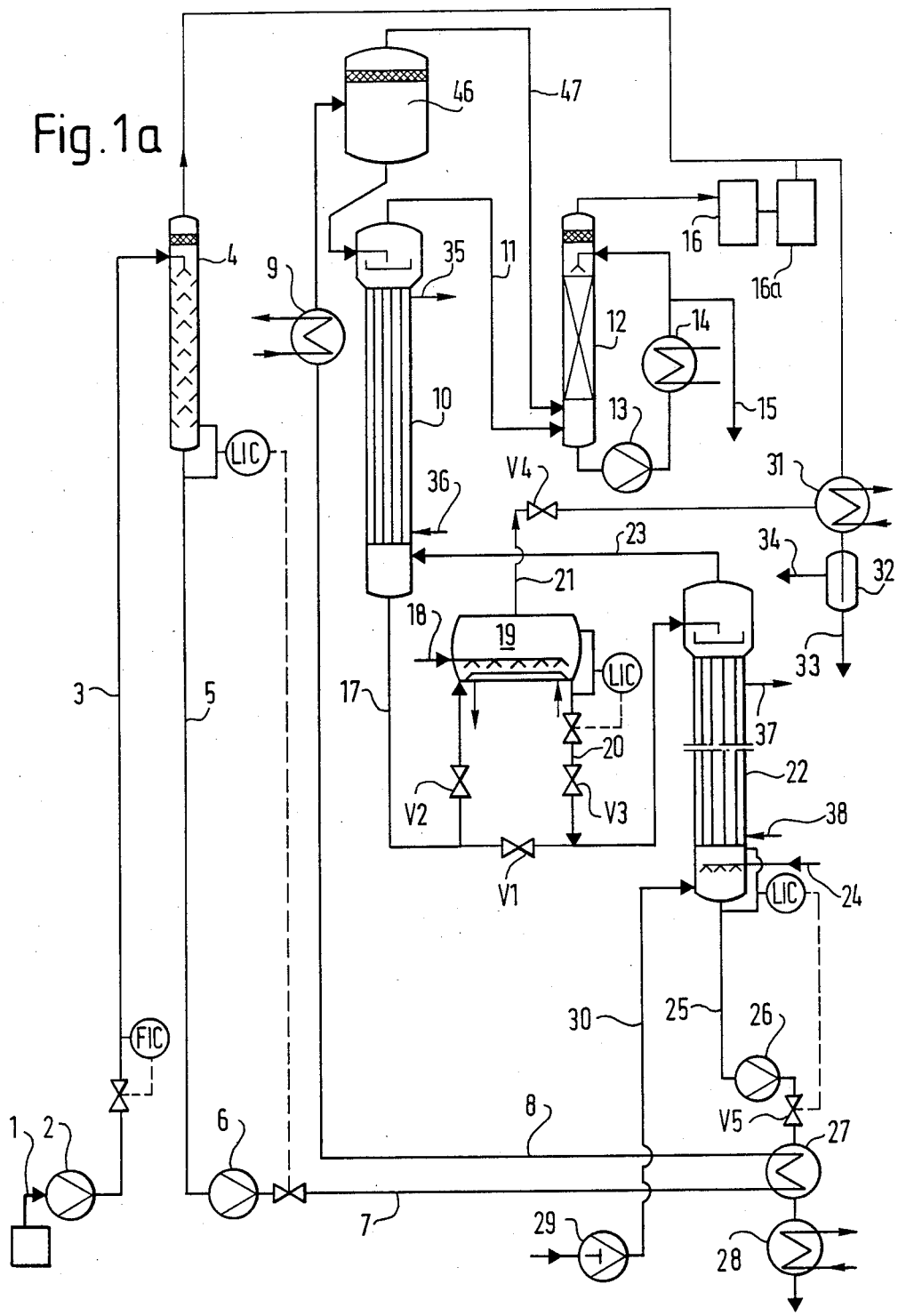

As is apparent from FIG. 1a, a flash vessel 46 may be connected between the high-temperature heat exchanger 9 and the falling film column 10, the top of said flash vessel 46 being connected to the bottom of the injection condenser 12 through the line 47. If required, the flash vessel 46 may be heated with the heating medium supplied to the high-temperature heat exchanger 9—this is not indicated in the drawing. The flashed crude oil is delivered from the bottom of the flash vessel 46 to the distributor in the head of the falling film column 10.

Thereupon, the crude oil heated in the high-temperature heat exchanger 9 to the working temperature is fed directly—or via the incorporated flash zone 46—to the distributor provided in the head of the first falling film column 10. This distributor as well as the further distributors are provided with (not shown) small vapor passage tubes of suitable dimensions to pass the vapors from one zone to the other with a minimum of pressure drop (e.g. less than 0.008 mbar). The initial zone of the countercurrent falling film stripping steam distillation zones is realized within this falling film column 10. According to an important aspect of the present invention, trickle passages having a hydraulic equivalent diameter of 73 to 120 mm, or the equivalent thereof in the case of non-tubular trickle passages, and having a length of 2 to 6 m are formed in this falling film column 10. Preferably, these trickle passages have a hydraulic equivalent diameter of approx. 84 to 108 mm, the length of the trickle passages being approx. 3 to 5 mm. i.e. indirectly heated tube bundle columns, in which the liquid film trickles down the inner walls of the tubes, are well suited. In the embodiment described with reference to FIG. 1, the falling film column 10 has provided therein a tube bundle comprising 60 tubes (inner diameter 84 mm, length 4 m), at the inner walls of which the liquid film flows down. In this case, the inner diameter corresponds directly to the hydraulic equivalent diameter of the trickle passage. As is well known, according to Prandtl the "hydraulic equivalent radius" $r_h$ of a trickle passage is defined to be $$r_h = F/U;$$

where F=cross-sectional area and U=the wetted cross-sectional circumference (cf. "Fü hrer durch die Strö mungslehre" by Ludwig Prandtl, published by Verlag Friedrich Vieweg & Sohn, Braunschweig, 1942, p. 145).

For non-tubular trickle passages the equivalent of the hydraulic equivalent diameter can be derived according to known equations, as e.g. specified by Bruno Eck in "Technische Strö mungslehre", published by the Springer Verlag, Berlin 1949, p. 109, according to which the hydraulic equivalent diameter of a flow or trickle passage having a non-circular cross-section is determined from the equivalent of the cross-sectional area in the sense of $$d = 4F/U$$

where
 d=hydraulic equivalent diameter of the noncircular trickle passage;
 F=cross-sectional area of the non-circular trickle passage;
 U=circumference of the non-circular trickle passage.
Within the falling film column 10, a heating medium supplied from a predetermined source through the connecting piece 36 and discharged through the connecting piece 35 flows around each individual tube of the tube bundle. Within the provided temperature range, high pressure vapor or a high temperature oil (e.g. "HT oil) (higher aromatic compounds) may be used as a heating medium, the use of the high temperature oil producing a temperature drop on the side of the heating medium and thus being preferred.

The mixture of contaminated stripping steam, free fatty acids separated from the crude oil and other low-boiling components, which collects in the head of the falling film column 10, is withdrawn through the line 11 and introduced into the injection condenser 12. The 13 sucks away the condensate collecting at the bottom of the injection condenser 12 and urges it into the circulation line, which is passed via the cooler 14. Thereupon, the resulting condensate is continuously withdrawn through the line 15, whereas the cooling medium is again injected into the upper portion of the injection condenser 12. Finally, a line sufficiently dimensioned to ensure a minimum flow pressure drop extends from the head of the injection condenser 12 to the first booster stage of the vacuum system 16, 16a.

The oil downflowing at the inner wall of the tube bundle in the falling film column 10 collects at the bottom thereof and is withdrawn through the line 17. Within the line 17 a check valve $V_1$ is provided, which is closed when the already partially purified oil additionally is to be directed via the hold-up vessel 19.

The supply to the hold-up vessel 19 may be shut off by the control valve $V_2$ and the discharge line from the hold-up vessel 19 may be locked by means of the control valve $V_3$. Stripping steam may be introduced into the hold-up vessel 19 through the supply line 18. The contaminated stripping steam loaded with the thermal degradation products is discharged from the hold-up vessel 19 through the line 21 and after passing of the control valve $V_4$ supplied to a usual condenser 31. If the hold-up vessel 19 is operated under a working pressure of approx. 60 to 260 mbar and only 0.02 to 0.2, preferably 0.1% by weight of stripping steam of the crude oil throughput are introduced into the hold-up vessel 19, the vapors withdrawn from the hold-up vessel 19 can be precipitated in the condenser 31 with ordinary cooling water and thus do not burden the vacuum system.

The already largely purified crude oil withdrawn from the bottom of the falling film column 10 reaches the head of the last falling film column 22 either directly via the line 17 or after passing of the hold-up vessel 19 and is distributed to the various trickle passages through the distributors thereof. The final zone of the counter-current falling film stripping steam distillation zones is realized within the falling film column 22. A collecting line 23 extends from the head of the falling film column 22 to the bottom of the falling film column 10 so that between both falling film columns 10 and 22 there is liquid commucation, on the one hand, and vapor communication, on the other hand. According to an important aspect of the invention, trickle passages having a hydraulic equivalent diameter of 25 to 33 mm, or the equivalent thereof in the case of non-tubular trickle passages, and having a length of 6 to 10 m are provided within this falling film column 22. Preferably, these trickle passages have a hydraulic equivalent diameter of 28 to 32 mm, the length thereof being round about 8 m.

In the embodiment described with reference to FIG. 1, the falling film column 22 comprises a tube bundle including 150 tubes having an inner diameter of 33 mm and a length of 8 m. A heating medium, which is supplied through the connecting piece 38 and discharged through the connecting piece 37, flows around these tubes. The crude oil flows down at the inner walls of the tubes, the separation of the residual low-boiling companion substances taking place simultaneously, and finally reaches the bottom of the falling film column 22. Through the line 24 stripping steam, preferably so-called "super-pure steam", which previously has been produced by evaporation of previously distilled and degasified water, is supplied thereto.

Through the line 30, which is provided with a metering valve 29, a complexing agent such as e.g. citric acid may be supplied from a storage to the bottom of the falling film column 22 to increase the stability of the finished oil. Finally, the finished oil is withdrawn from the bottom of the falling film column 22 through the line 25 and urged through the heat exchanger 27 by means of the pump 26, where it imparts the essential part of its sensible heat to the crude oil to be treated. Finally, in order to ensure a good storage stability of the finished oil, a further indirect cooling to the lowest possible temperature at which the respective finished oil can just still be pumped takes place by means of cooling water in the heat exchanger 28. Where appropriate, a polishing filtration under inert gas atmosphere may be provided subsequently.

As is apparent from the schematic view according to FIG. 1, both the degasification stage 4 and the hold-up vessel 19 preferably are operated under such conditions that the vapors withdrawn therefrom respectively precipitate in the condenser 31 by means of ordinary cooling water at a temperature below 60° C. and may condense as regards the condensable phases. The discharge of the resultant condensate after separation in the phase separator 32 takes place, on the one hand, as an aqueous phase through the line 33, which together with the condensate of the vacuum system is processed in a manner known per se to meet today's environmental requirements. The ligher organic phase precipitating in the separator 32 as the upper phase is withdrawn through the line 34, which on account of the low amount obtained best is not carried out continuously but periodically.

In an apparatus of the described kind both the physical refining and the deodorization of crude oil can be carried out. Suitably, the respective operational conditions differ. Based on a usual content of free acids of approx. 5% by weight, the physical refining is carried out down to a final content of free acids of less than 0.031% under the following conditions:

| | |
|---|---|
| Head pressure of the initial zone: | between 2.5 and 10 mbar preferably 5 and 8 mbar; |
| Bottom pressure of the final zone: | at most 2 mbar higher, preferably less than 1.4 mbar higher than the head pressure in the initial zone; |
| Inlet temperature of the crude oil: | 250 to 275° C., preferably 255 to 265° C.; |
| Outlet temperature of the finished oil: | 225 to 280° C., preferably 260 to 275° C.; |
| Reynolds number of the liquid film: | in the initial zone above 200 in the final zone above 250. |

Under these conditions, also the deodorization of the crude oil takes place together with the physical refining.

In some cases, already chemically refined crude oil may be available as the starting material, which then need only be deodorized according to the process of the invention. Mostly, such a starting material has a content of free acids which is below 0.3% by weight. In this case, the deodorization is carried out under the following conditions:

| | |
|---|---|
| Head pressure of the initial zone: | between 2.5 and 10 mbar preferably 5 and 8 mbar; |
| Bottom pressure of the final zone: | at most 2 mbar higher, preferably less than 1.4 mbar higher than the head pressure in the initial zone; |
| Inlet temperature of the crude oil: | 250 to 275° C., preferably 255 to 265° C.; |
| Outlet temperature of the finished oil: | 255 to 280° C., preferably 260 to 275° C.; |
| Reynolds number of the liquid film: | in the initial zone above 350 in the final zone 400 to 500. |

The crude oil flow rate is approx. 1.4 to 1.8 times, preferably approx. 1.6 times the oil flow rate in the physical refining.

According to further embodiments of the invention, the apparatus explained above with reference to FIG. 1 may be modified in various parts. E.g. it is possible—as shown by means of the schematic view according to FIG. 2—not to feed the crude oil, the temperature of which has been adjusted in the heat exchanger 9 to the working temperature, to the distributor of the falling film column 10 but to provide upstream thereof a further falling film column 44 and to feed the crude oil to the distributor in the head of the falling film column 44. In this case, the initial zone of the countercurrent falling film stripping steam distillation zones is of two-zone type and realized within the two falling film columns 44 and 10.

Figure 2:
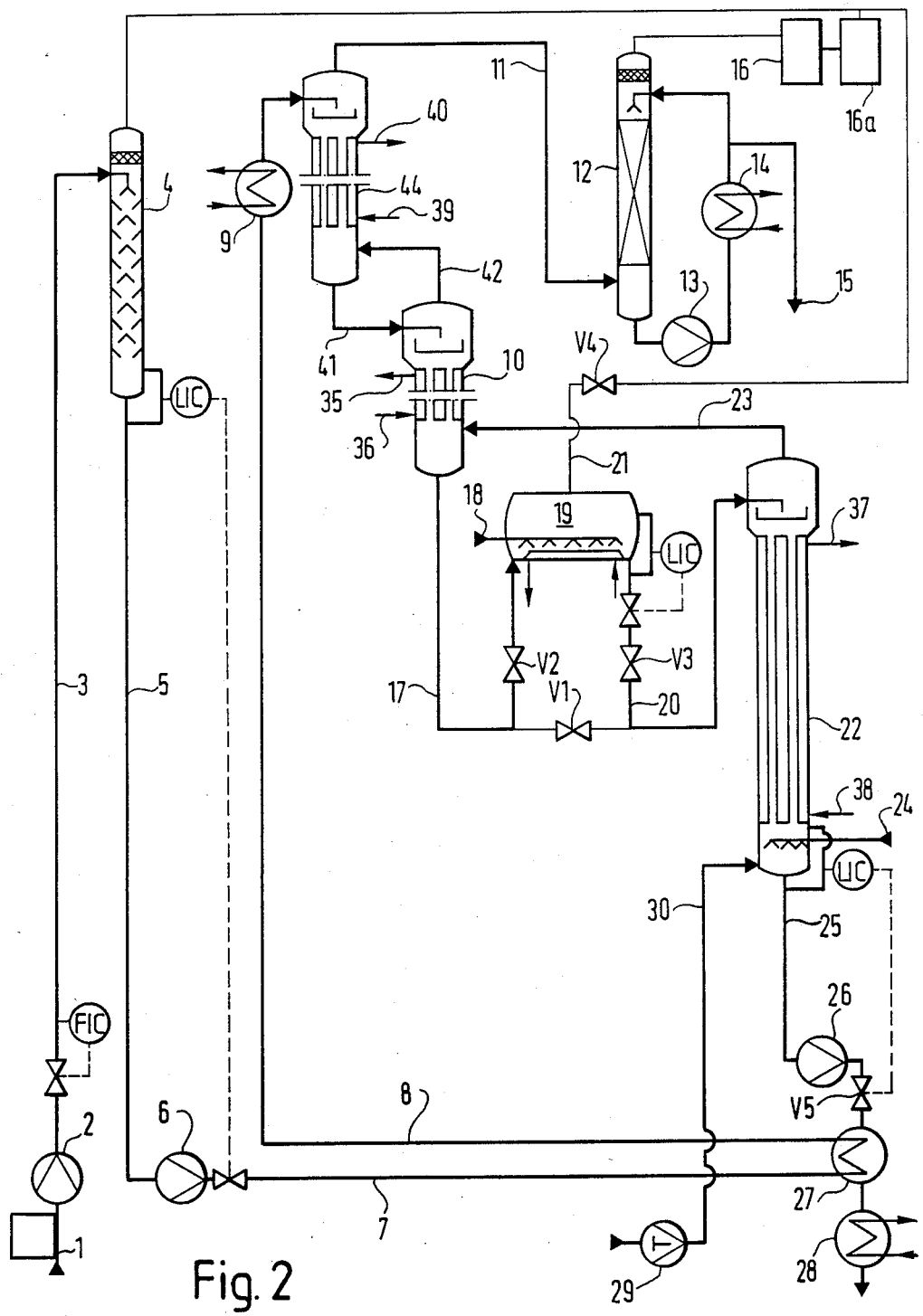
FIG. 2 is a flow diagram with three countercurrent falling film stripping steam distillation zones for carrying out the process according to the invention.

As shown in FIG. 2, in this case the vapor collecting line 11 extends from the head of the falling film column 44 to the injection condenser 12.

The falling film column 44 ensures approx. one theoretical separation stage. Within the falling film column 44 trickle passages having a hydraulic equivalent diameter of 120 to 150 mm and a length of 2 to 3 m are provided. Preferably, the trickle passages of the falling film column 44 have a hydraulic equivalent diameter—or the equivalent thereof in the case of non-tubular trickle passages—of 125 to 140 mm, the length being approx. 2 m. These trickle passages may e.g. be formed within the tubes of a tube bundle column. The trickle passages are heated indirectly by means of a heating medium, which is supplied through the connecting piece 39 and discharged through the connecting piece 40. The crude oil reaches the bottom of the falling film column 44 and is withdrawn therefrom through the line 41 and fed to the distributor in the head of the falling film column 10. A vapor collecting line 42 extends from the head of the falling film column 10 to the bottom of the falling film column 44 so that there is also vapor and liquid communication between the falling film columns 44 and 10 operating in series.

In other respects, the schematic view of FIG. 2 corresponds to that of FIG. 1, wherein equal reference numerals relate to equal structural parts so that reference is made to FIG. 1 as regards the further explanation.

The falling film columns 10, 22 and 44 explained with reference to FIGS. 1 and 2 need not necessarily be tube bundle columns.

An alternative embodiment of these falling film columns is shown by FIG. 3 as well as the respective cross-sectional view according to FIG. 4. In the falling film column 50 illustrated therein the liquid film trickles down at the outer side of cartridges 51, through the interior of which the heating medium is passed. The latter is supplied through the connecting piece 52 and collected through tubes 53 extending with their open end in close proximity to the caps of the cartridges 51 and is discharged through the discharge connection 54. The liquid to be treated is fed through the inlet 55 to the distributor 56 and from there via the inlet passages 57 reaches the cap of the cartridges 51 to flow down as a thin film at the outer wall thereof. The interspace between adjacent cartridges defines the trickle passage 58, whose equivalent of the hydraulic equivalent diameter must amount to e.g. 73 to 150 mm if the initial zone of the countercurrent falling film stripping steam distillation zone is realized within the column 50. The treated liquid collects at the bottom of the column 50 and is withdrawn therefrom through the line 59. The vapors obtained in a falling film column which is disposed further downstream are introduced through the inlet 60 to the bottom of the column 50 and leave the same through the withdrawal line 61 together with the impurities removed from the treated liquid.

The described column 50 is suited especially for the physical refining of oil when the release of relatively large vapor amounts from the downtrickling liquid film must be expected, e.g. when the content of free fatty acids is more than 5% by weight.

FIG. 5 shows a true trickle column 70, in which especially the final zone of the countercurrent falling film stripping steam distillation zones can be realized, because here the heat requirement is only very low due to the very low evaporation proportion of e.g. 5 kg/ton in the case of physical refining and of only 1 kg/ton of the crude oil throughput in the case of deodorization. Such well-insulated, highly effective true trickle passages are known and are sold e.g. by the company Gebrüder Sulzer AG, Winterthur, Switzerland. On account of special packings within these true trickle columns the same ensure six to eight theoretical separation stages over a length of 6 to 8 m and only have a pressure drop of approx. 0.1 to 0.5 mbar per theoretical separation stage. The packing elements consist of obliquely folded lamellas so laminated as to form open, intersecting passages extending at an inclination to the column axis. Thus, the vapors are mixed when flowing through the packing in the direction of the parallel layers. By rotating successive packings, a radial blending across the entire column cross-section is effected. At the points of intersection of the trickle passages the liquid film surface is constantly renewed. Due to the extremely low pressure drop in such true trickle columns, it is possible according to a further aspect of the invention in the realization of the final zone in such a trickle column to pass the vapors also through trickle passages having a smaller hydraulic equivalent diameter than 25 mm—or the equivalent thereof in the case of non-tubular trickle passages.

E.g. the final zone can be realized in such trickle columns the packages of which have a trickle passage diameter being as low as 8 mm.

The crude oil already treated in the initial zone provided upstream is supplied through the inlet 71 and reaches the distributor 72 of the trickle column 70. The liquid is passed from the distributor 72 to packings of the above-described kind. At the bottom of the trickle column 70, stripping steam is supplied through the inlet 73 and it is discharged together with the released impurities at the head of the trickle column 70 through the discharge line 74. The finished oil collecting at the bottom is withdrawn through the line 75 provided with the control valve V₅.

Figure 6:
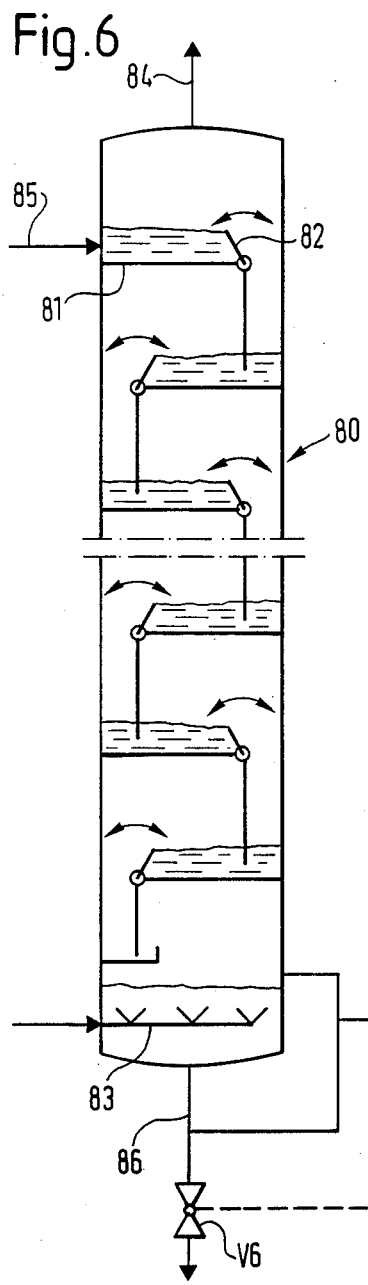
FIG. 6 shows an upright plate column, which may be used as a hold-up vessel.

The hold-up vessel 19 may preferably be designed in the form of a vertically disposed countercurrent plate column 80, as shown in FIG. 6. This plate column 80 comprises a number of plates 81, each plate 81 being provided at the free end thereof with an overflow weir 82. Each individual overflow weir 82 may be varied in height by magnetic transfer or other suitable coupling means, which comes up to a variation of the retention time through this plate column 80. This permits an adaptation of the residence time of the liquid to the respective requirements. The addition of stripping steam is carried out through the distributor 83 at the bottom of the plate column 80 so that the stripping steam must bubble through the liquid levels of all plates 81. Under the specified conditions, the pressure drop of the plates does not interfere since the vapors leaving the plate column 80 through the collecting line 84 are condensed in a condenser before reaching the vacuum system. The liquid is fed to the topmost plate 82 through the inlet 85 and finally withdrawn through the line 86 provided with the control valve V₆ and supplied to the final zone connected downstream.

It has already been said that the provision of a hold-up vessel is not necessary in each case. For the physical refining and/or deodorization of thermally very sensitive edible oils such as e.g. sunflower oil it may rather be suitable to do without the hold-up vessel in order to permit a rapid flow rate of the oil through the high-temperature part of the apparatus.

The system according to the invention provides at least two different countercurrent falling film stripping steam distillation zones which are realized in different, serially operating falling film columns interconnected by vapor and liquid communication. Each falling film column comprises a distributor distributing the crude oil onto the walls of the trickle passages—or the equivalents thereof—, further, trickle passages having a substantially uniform hydraulic equivalent diameter, or the equivalent thereof in the case of non-tubular and, respectively, non-cylindrical trickle passages, and, finally, a liquid collector at the lower end of the trickle passages. The falling film columns are different when the hydraulic equivalent diameters thereof—and, respectively, the equivalent thereof in the case of non-tubular (non-cylindrical) trickle passage diameters—differ by more than 10 mm.

These different countercurrent falling film stripping steam distillation zones may be realized is spatially separated falling film columns. In this case, a pipe line 17 and 41, respectively, connects the head of the following falling film column 22 and 10, respectively, to the bottom of the preceding falling film column 10 and 44, respectively.

Figure 7:
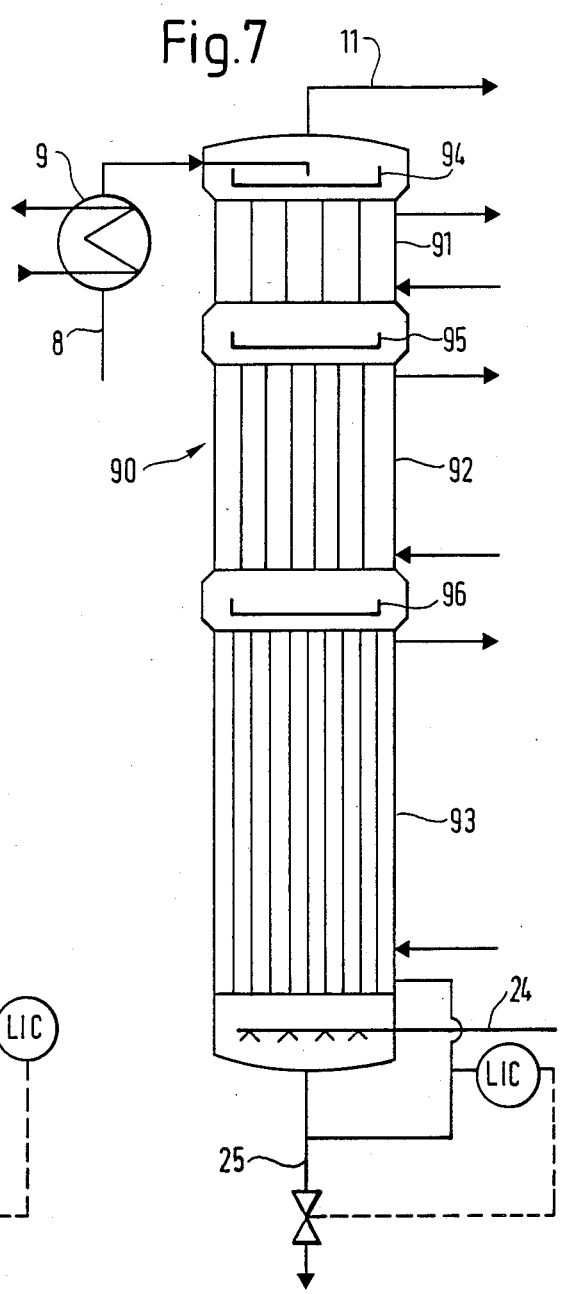
FIG. 7 is a schematic view of a column section, in which three different falling film columns for realizing the first sub-zone, the second sub-zone and the final zone are integrated.

According to an alternative embodiment, the various falling film columns for realizing the initial zone(s) and the final zone of the countercurrent falling film stripping steam distillation zones may be integrated in a single column section 90, as shown schematically in FIG. 7.

The illustrated column section 90 has three different falling film columns 91, 92 and 93 integrated therein. In the falling film columns 91 and 92 the two sub-zones of the initial zone and in the falling film column 93 the final zone of the countercurrent falling film stripping steam distillation zone are realized. It is shown schematically that in the direction of flow of the liquid the hydraulic equivalent diameters of the trickle passages in the falling film columns 91, 92 and 93 have continuously decreasing values so as to satisfy the above-specified conditions. On the other hand, the number of tubes per falling film column increases so as to observe at least the initially discussed total circumferential areas. Each individual falling film column 91, 92 and 93 is provided with an inlet and an outlet for the heating medium, as illustrated schematically.

For the operation, the already preheated liquid fed through the line 8 is adjusted in the high-temperature heat exchanger 9 to the working temperature and then reaches the distributor 94 in the falling film column 91. The liquid collected at the bottom of the falling film column 91 is again distributed to the trickle passages of the falling film column 92 through the distributor 95. The same takes place at the bottom of the falling film column 92, where the liquid is again distributed to the trickle passages of the falling film column 93 by the distributor 96. Finally, the liquid collected at the bottom of the column 93 is withdrawn through the line 25. Through the line 24 stripping steam is introduced to the bottom of the falling film column 93, which steam, after flowing through the various falling film columns 93, 92 and 91, finally is withdrawn together with the impurities separated from the liquid at the head of the falling film column 91 through the collecting line 11.

With this embodiment the residence time of the individual liquid particles in the high-temperature part of the apparatus can be kept below 30 sec. although three separate countercurrent falling film stripping steam distillation zones operating in series and being in vapor and liquid communication with each other are provided. In spite of these three different zones, the difference between the stripping steam pressure at the bottom of the column 93 and the (stripping steam plus vaporous impurity) pressure at the head of the falling film column 91 is very low and amounts e.g. only to 1.0 mbar.

If a flash treatment is provided—e.g. because the crude oil comprises more than 5% by weight of free fatty acids and other low-boiling components—the flash vessel 46 (cf. FIG. 1a) is suitably connected between the high-temperature heat exchanger 9 and the first falling film column 10 and 44, respectively. Preferably, this flash vessel is disposed above the head of this first falling film column 10 and 44, respectively, so that the flashed mixture gets onto the distributor in the first falling film column 10 and 44, respectively, only under the action of its weight. The vapors withdrawn from the flash vessel 46 are supplied to the bottom of the condensation system 12 through a line 47. The flash zone, too, may be realized within a falling film column and, respectively, trickle column—e.g. within a falling film column 50 (length approx. 1 to 2 m) equipped with cartridges 51 and explained by means of FIGS. 3 and 4—, wherein, however, no stripping steam is supplied. Apart therefrom, simple and common flash vessels 46 of known design may be used. According to a further advantageous aspect of the invention, the flash vessel 46, too, is integrated into the column section 90 (not illustrated in FIG. 7).

The following Examples will further describe the invention without limiting the scope thereof.

EXAMPLE 1

For physcial refining, the apparatus according to FIG. 1 is designed for the flow rate of 10,000 kg palm oil per hour.

The palm oil contains 5% by weight of fatty acid and is taken from the storage tank 1 at a temperature of 60° C. The head of the degasification stage 4 is operated at a pressure 150 torr. In the heat exchanger 27 the degasified but still water-containing oil (average water content 0.1% by weight) is heated up to 243° C. in exchange with the finished oil withdrawn from the bottom of the falling film column 22. The amount of heat to be exchanged in the heat exchanger 27 is 1,065,000 kcal/h. During this step, the finished oil is cooled down to 70° C. and may then by means of ordinary cooling water be cooled down in the final cooler 28 to a temperature of 50° C. to improve the storage stability. The crude oil heated in the heat exchanger 27 to 243° C. is heated in the high-temperature heat exchanger 9 to 255° C., which requires 80,000 kcal/h. The charging to the head distributor of the falling film column is carried out at this temperature, the main separation of the volatile companion substances except for a residual content of approx. 0.5% by weight of crude oil throughput taking place in said column. The falling film column 10 comprises sixty tubes having an inner diameter of 84 mm and a length of 4 m, at the inner wall of which the crude oil flows down. The film thickness of the oil film is approx. 0.35 mm and the Reynolds number thereof is approx. 223. With a crude oil throughput of 10,000 kg/h and a stripping steam throughput of 0.5% by weight of the crude oil throughput, while the working pressure in the head of the falling film column 10 is 5.3 mbar, there is only a pressure drop of 0.4 mbar. The heating medium—HT oil—supplied through the connecting piece 36 is supplied at a temperature of approx. 270° C. so that the oil at the bottom of the column 10 has a temperature of approx. 263° C.

For the physical refining of palm oil, it is suitable to connect the hold-up vessel 19 so as to achieve a good decolorization of the oil. In this case, the valve $V_1$ remains closed and the valves $V_2$, $V_3$ and $V_4$ must be opened so that the hold-up vessel communicates with that part of the vacuum system which permits the adjustment of a working pressure of 200 mbar. For removing the thermal degradation products of the thermal decomposition of the pigments such as e.g. carotene, which takes place under the time influence, stripping steam in an amount of 30 to 50 kg/h is supplied through the line 18, said steam being condensed together with the organic thermal degradation products in the condenser 31 by means of cooling water at 60° C.

The heat-bleached oil withdrawn from the hold-up vessel 19 is fed to the distributor of the falling film column at a temperature of 263° C. The latter column is a tube bundle column including 153 tubes having an inner diameter of 33 mm and a length of 8 m. The liquid downflowing at the inner wall of the tubes has a Reynolds number round about 277; the film thickness of the liquid film amounts to approx. 0.38 mm. As a heating medium HT oil at a temperature of 265° to 266° C. is used. The temperature at the bottom of the column 22 amounts to about 264° C.

Per hour 50 kg of super-pure stripping steam are introduced through the inlet, wherein there results a pressure drop of less than 0.85 mbar in the falling film column 22 so that the total pressure drop for both falling film columns 22 and 10 is below 1.25 mbar. Thus, with a working pressure of 5.3 mbar in the head of the falling film column 10, the working pressure resulting for the bottom of the falling film column 22 is less than 6.25 mbar. This low bottom pressure is a reason for the low stripping steam requirement of less than 0.5% of the crude oil throughput.

5 g of citric acid per ton of crude oil are introduced through the line 30 in order to improve the storage stability of the finished oil.

EXAMPLE 2

For deodorizing, an apparatus according to FIG. 2 is designed for the throughput of 16,000 kg of palm oil/h. The maximum content of free fatty acids in the palm oil is 0.375% by weight.

As far as no other data are given, the process is substantially carried out analogously to Example 1.

The degasified crude oil is heated in the heat exchanger 27 to 243° C. in exchange with the downflowing finished oil; the amount of heat to be exchanged therein is 1,705,000 kcal/h. The remaining heating to the working temperature of 255° C. is carried out in the high-temperature heat exchanger 9 by means of a high-temperature medium, wherein the amount of heat to be exchanged is 125,000 kcal/h.

The crude oil is fed to the distributor of the falling film column 44 at a working temperature of 255° C. In the present case, a tube bundle column is concerned which includes 54 tubes having an inner diameter of 120 mm and a vertical length of 2 m. The working pressure in the head of the column 44 is kept at 5.3 mbar. Within the column 44, separation of the principal amount of free fatty acids in the order of approx. 35 kg/h takes place (0.375% by weight correspond to approx. 60 kg/h of free fatty acids).

At the bottom of the column 44, the oil has a temperature of approx. 261° C. and it is fed at this temperature to the head of the distributor of the falling film column 10. The falling film column 10 also is in the form of a tube bundle column including 66 tubes having an inner diameter of 84 mm and a vertical length of 3 m. In this zone, the content of free fatty acids reduces by further 15 kg per hour. The oil has a temperature of 264° C. at the bottom of the column 10 and it is introduced into the hold-up vessel 19 at this temperature. 64 kg stripping steam per hour are introduced into the hold-up vessel as so-called "super-pure stripping steam". The stripping steam temperature is kept at approx. 264° C.

The heat-bleached palm oil withdrawn from the hold-up vessel is fed at a temperature of 264° C. to the distributor of the falling film column 22. This column is also designed as a falling film column and comprises 153 tubes having an inner diameter of 33 mm and a vertical length of 7 m. 64 kg of super-pure stripping steam per hour are introduced to the bottom of the falling film column 22 through the line 24. Furthermore, 5 g of citric acid per ton of finished oil are introduced through the line 30 in order to improve the storage stability thereof. The finished oil is withdrawn at a temperature of approx. 265° C. through the line 25 and cooled to 70° C. in heat exchange with the crude oil in the heat exchanger 27. Subsequently, the finished oil is cooled down to 50° C. in the heat exchanger 28.

The pressure drop through all three zones, which amounts to 0.97 mbar, is only little in excess of the head pressure of 5.3 mbar. This low bottom pressure and the favorable countercurrent and exchange conditions between the downtrickling oil film and the rising vapors are the reason for the low requirement of stripping steam.

In the following please find a summary of the most important parameters in the physical refining (and deodorization) and, respectively, only the deodorization of palm oil an an apparatus according to FIG. 1 or 2 with a flow rate of 10,000 kg of oil per hour for the physical refining and, respectively, 16,000 kg/h for the deodorization.

| falling film column (No.) | tube diam. (mm) | tube length (m) | number of tubes | Re vapour | Re liqu. | film thickness (mm) | resid. time (sec.) | press. drop (mbar) |
|---|---|---|---|---|---|---|---|---|
| Physical refining in two zones according to FIG. 1 | | | | | | | | |
| 10 | 108 | 4 | 60 | 1096 | 223 | .35 | 7.8 | .08 |
| 22 | 33 | 8 | 153 | 326 | 277 | .38 | 13.6 | .79 |
| Physical refining in three stages according to FIG. 2 | | | | | | | | |
| 44 | 120 | 2 | 54 | 1508 | 223 | .35 | 3.9 | .027 |
| 10 | 84 | 3 | 66 | 656 | 255 | .37 | 5.4 | .044 |
| 22 | 33 | 7 | 153 | 327 | 277 | .38 | 11.9 | .74 |
| Deodorization in two zones according to FIG. 1 | | | | | | | | |
| 10 | 108 | 4 | 60 | 354 | 363 | .41 | 5.7 | .019 |
| 22 | 33 | 8 | 153 | 343 | 452 | .43 | 9.4 | 1.08 |
| Deodorization in three stages according to FIG. 2 | | | | | | | | |
| 44 | 120 | 2 | 54 | 380 | 364 | .41 | 2.9 | .009 |
| 10 | 84 | 3 | 66 | 331 | 424 | .43 | 3.9 | .032 |
| 22 | 33 | 7 | 153 | 298 | 465 | .45 | 8.5 | .93 |

I claim:

1. A process for removing lower boiling components from at least one liquid member selected from the group of high-boiling, organic, edible oils; high-boiling, organic, edible fats; high-boiling, organic, edible esters; or mixtures thereof; employing continuous countercurrent falling film stripping steam distillation in an externally imposed termperature field, which comprises heating said liquid member to 220° to 280° C., at a working pressure between 2 and 10 mbar, causing said liquid member at 220° to 280° C. and said working pressure to flow down as a thin film having a film thickness of less than 1.0 mm at the wall of substantially vertically arranged surfaces forming trickle passages maintaining at least a part of said passages at a higher termperature than the downflowing liquid, and passing a vapor of a low-molecular weight liquid countercurrently to said liquid through said trickle passages; which comprises providing at least two countercurrent falling film stripping steam distillation zones operating in series and being in vapor and liquid communication with each other and providing an unrestricted vapor flow connection and wherein the hydraulic equivalent diameters of the trickle passages in the final distillation zone downstream in the direction of the downflowing liquid are smaller than the hydraulic equivalent diameters of the trickle passages of the initial zone(s) located upstream of said final distillation zone; and supplying stripping steam exclusively to the bottom of said final distillation zone.

2. The process of claim 1 which comprises maintaining the pressure drop through all countercurrent falling film stripping steam distillation zones less than 2.0 mbar.

3. The process of claim 1 which comprises maintaining the pressure drop through all countercurrent falling film stripping steam distillation zones less than 1.4 mbar.

4. The process of claim 1 which comprises maintaining the film thickness of the liquid film in the initial zone between 0.2 and 0.5 mm and maintaining the film thickness of the liquid film in the final zone between 0.35 and 0.60 mm.

5. The process of claim 1 which comprises maintaining the Reynolds number of the downflowing liquid in the initial zone between 200 and 280 and maintaining the Reynolds number of the liquid in the final zone between 250 and 300.

6. The process of claim 1 which comprises maintaining the temperature of the trickle passages in the initial zone at least 4° K. in excess of the liquid temperature, and maintaining the temperature of the trickle passages in the final zone between the liquid temperature and at most, 2° K. in excess thereof.

7. The process of claim 1 which comprises keeping the total residence time of predetermined liquid particles in the initial zone and in the final zone below 30 seconds.

8. The process of claim 1 which comprises degasifying the liquid to be treated in a pretreatment stage under a pressure of 60 to 280 mbar and at a temperature between 40° and 100° C. and introducing said liquid into the initial zone with a water content of about 0.05 to 0.2% by weight.

9. The process of claim 1 wherein the liquid to be treated has a relatively high proportion of free fatty acids and other low-boiling components, and which comprises carrying out a flash treatment immediately before entry into the initial distillation zone, and wherein said flash treatment is conducted at substantially the same working pressure as in the initial zone; and separating and condensing the vapors released upon the flashing.

10. The process of claim 1 which comprises supplying liquid from the bottom of the initial zone to a hold up zone and holding said liquid in said residence zone under a pressure of 60 to 280 mbar at the bottom temperature of the preceding initial zone for about 5 to 60 minutes and then feeding said liquid to a distributor in the final zone.

11. The process of claim 10 which comprises introducing vapor of a low-molecular liquid in an amount of about 0.02 to 0.2% by weight of the liquid throughput into the residence zone.

12. The process of claim 11 which comprises condensing contaminated stripping steam which is obtained in the hold up zone directly in the cooling water of a condensation cooler.

13. The process of claim 1 which comprises introducing a complexing agent into the bottom of the final zone.

14. The process of claim 1 which comprises employing as the vapor of the low-molecular liquid, steam produced from previously distilled and degasified water.

15. A process for removing lower boiling components from at least one liquid member selected from the group of high-boiling, organic, edible oils; high-boiling, organic, edible fats; high-boiling, organic, edible esters; or mixtures thereof; empolying continuous countercurrent falling film stripping steam distillation in an externally imposed temperature field, which comprises heating said liquid member to 220° to 280° C., at a working pressure between 2 and 10 mbar, causing said liquid member at 220° to 280° C. and said working pressure to flow down as a thin film having a film thickness of less than 1.0 mm at the wall of substantially vertically arranged surfaces forming trickle passages, maintaining at least a part of said passages at a higher temperature than the downflowing liquid, and passing a vapor of a low-molecular weight liquid countercurrently to said liquid through these trickle passages, which comprises providing at least two countercurrent falling film stripping steam distillation zones operating in series and being in vapor and liquid communication with each other and providing an unrestricted vapor flow connection and providing at least two theoretical separation stages in the initial zone thereof directly adjacent the liquid charge; flowing the vapors through trickle passages having a hydraulic equivalent diameter of 73 to 150 mm in said initial zone; providing at least six theoretical separation stages in the final zone operating downstream of said initial zone; flowing the vapors through trickle passages having a hydraulic equivalent diameter of 25 to 33 mm; and supplying stripping steam exclusively to the bottom of the final zone.

16. The process of claim 15 which comprises subdividing the initial zone into two sub-zones; flowing the vapors in the first sub-zone directly adjacent the liquid charge through trickle passages having a hydraulic equivalent diameter of 150 to 120 mm; and flowing the vapors in the second sub-zone directly adjacent to said first sub-zone through trickle passages having a hydraulic equivalent diameter of 73 to 120 mm.

17. The process of claim 16 wherein said trickle passages are tubular.

18. The process of claim 16 wherein said trickle passages are non-tubular.

19. The process of claim 15 which comprises keeping the pressure drop through all countercurrent falling film stripping steam distillation zones less than 2.0 mbar.

20. The process of claim 15 which comprises keeping the pressure drop through all countercurrent falling film stripping steam distillation zones less than 1.4 mbar.

21. The process of claim 15 wherein the film thickness of the liquid film in the initial zone is kept between 0.2 and 0.5 mm and the film thickness of the liquid film in the final zone is kept between 0.35 and 0.60 mm.

22. The process of claim 15 wherein the Reynolds number of the downflowing liquid in the initial zone is kept between 200 and 280 and the Reynolds number of the liquid in the final zone is kept between 250 and 300.

23. The process of claim 15 which comprises maintaining the temperature of the trickle passages in the initial zone at least 4° K. in excess of the liquid temperature, and maintaining the temperature of the trickle passages in the final zone between the liquid temeprature and at most 2° K. in excess thereof.

24. The process of claim 15 wherein the total residence time of predetermined liquid particles in the initial zone and in the final zone is kept below 30 seconds.

25. The process of claim 15 which comprises degasifying the liquid to be treated in a pretreatment stage under a pressure of 60 to 280 mbar and at a temperature between 40° and 100° C. and introducing said liquid into the initital zone with a water content of about 0.05 to 0.2% by weight.

26. The process of claim 15 wherein the liquid to be treated has a relatively high proportion of free fatty acids and other low-boiling components, and which comprises carrying out a flash treatment immediately before entry into the initial distillation zone, and wherein said flash treatment is conducted at substantially the same working pressure as in the initial zone; and separating and condensing the vapors released upon the flashing.

27. The process of claim 15 which comprises supplying liquid from the bottom of the initial zone to a hold up zone and holding said liquid in said residence zone under a pressure of 60 to 280 mbar at the bottom temperature of the preceding initial zone for about 5 to 6 minutes and then feeding said liquid to a distributor in the final zone.

28. The process of claim 27 which comprises introducing vapor of a low-molecular liquid in an amount of about 0.02 to 0.2% by weight of the liquid throughput into the residence zone.

29. The process of claim 27 which comprises condensing contaminated stripping steam which is obtained in the hold-up zone directly in the cooling water of a condensation cooler.

30. The process of claim 15 which comprises introducing a complexing agent into the bottom of the final zone.

31. The process of claim 15 which comprises employing as the vapor of the low-molecular liquid, steam produced from previously distilled and degasified water.

32. The process of claim 1 which comprises maintaining the film thickness of the liquid film in the initial zone between 0.25 and 0.55 mm and maintaining the film thickness of the liquid film in the final zone between 0.35 and 0.70 mm.

33. The process of claim 1 which comprises maintaining the Reynolds number of the downflowing liquid in the initial zone between 350 and 400 and maintaining the Reynolds number of the liquid in the final zone between 400 and 500.

34. The process of claim 1 which comprises introducing a complexing agent into the liquid withdrawn from the bottom of the final zone which is partially cooled.

35. The process of claim 15 wherein the film thickness of the liquid film in the initial zone is kept between 0.25 and 0.55 mm and the film thickness of the liquid film in the final zone is kept between 0.35 and 0.70 mm.

36. The process of claim 15 wherein the Reynolds number of the downflowing liquid in the initial zone is kept between 350 and 400 and the Reynolds number of the liquid in the final zone is kept between 400 and 500.

37. The process of claim 15 which comprises introducing a complexing agent into the liquid withdrawn from the bottom of the final zone which is partially cooled.

* * * * *